United States Patent [19]

Sengupta

[11] Patent Number: 5,635,433
[45] Date of Patent: Jun. 3, 1997

[54] CERAMIC FERROELECTRIC COMPOSITE MATERIAL-BSTO-ZNO

[75] Inventor: Louise Sengupta, Warwick, Md.

[73] Assignee: The United States of America as represented by the Secretary of the Army, Washington, D.C.

[21] Appl. No.: 528,626

[22] Filed: Sep. 11, 1995

[51] Int. Cl.$^6$ .................... C04B 35/468; C04B 35/47
[52] U.S. Cl. ............................ 501/137; 501/138
[58] Field of Search .......................... 501/137, 138

[56] References Cited

U.S. PATENT DOCUMENTS

| | | | |
|---|---|---|---|
| 3,340,074 | 9/1967 | Herczog | 501/138 |
| 4,222,783 | 9/1980 | Atsumi et al. | 501/138 |
| 4,677,083 | 6/1987 | Uedaira et al. | 501/137 |
| 5,238,887 | 8/1993 | Kato et al. | 501/138 |
| 5,290,740 | 3/1994 | Abe et al. | 501/139 |
| 5,312,790 | 5/1994 | Sengupta et al. | 501/137 |
| 5,378,663 | 1/1995 | Abe et al. | 501/32 |
| 5,427,988 | 6/1995 | Sengupta et al. | 501/137 |
| 5,443,746 | 8/1995 | Harris et al. | 501/137 |
| 5,486,491 | 1/1996 | Sengupta et al. | 501/137 |

FOREIGN PATENT DOCUMENTS 63-86319  4/1988  Japan.

*Primary Examiner*—Deborah Jones
*Assistant Examiner*—Louis M. Troilo
*Attorney, Agent, or Firm*—Freda L. Krosnick; Muzio B. Roberto

[57] ABSTRACT

A novel ceramic ferroelectric material having a high dielectric constant, a low loss tangent, a low threshold voltage, a high nonlinear voltage exponent and a high tunability. The material is a composite comprising Barium Strontium Titanate (BSTO) and zinc oxide (ZnO). The preferred composite is represented by $Ba_{1-x}Sr_xTiO_3$—ZnO, wherein x is greater than 0.00, but less than or equal to 0.75, and wherein the percent weight ratio between BSTO and ZnO ranges from approximately 99%–50% and 1%–50% respectively. The novel materials possess superior electronic properties, and they may be employed in multilayer capacitors, capacitor-varistors, non-volatile computer memory or phased array antenna systems.

5 Claims, 6 Drawing Sheets

DIELECTRIC CONSTANT VERSUS ZINC OXIDE CONTENT (WT%) MEASURED AT 1 KHZ.

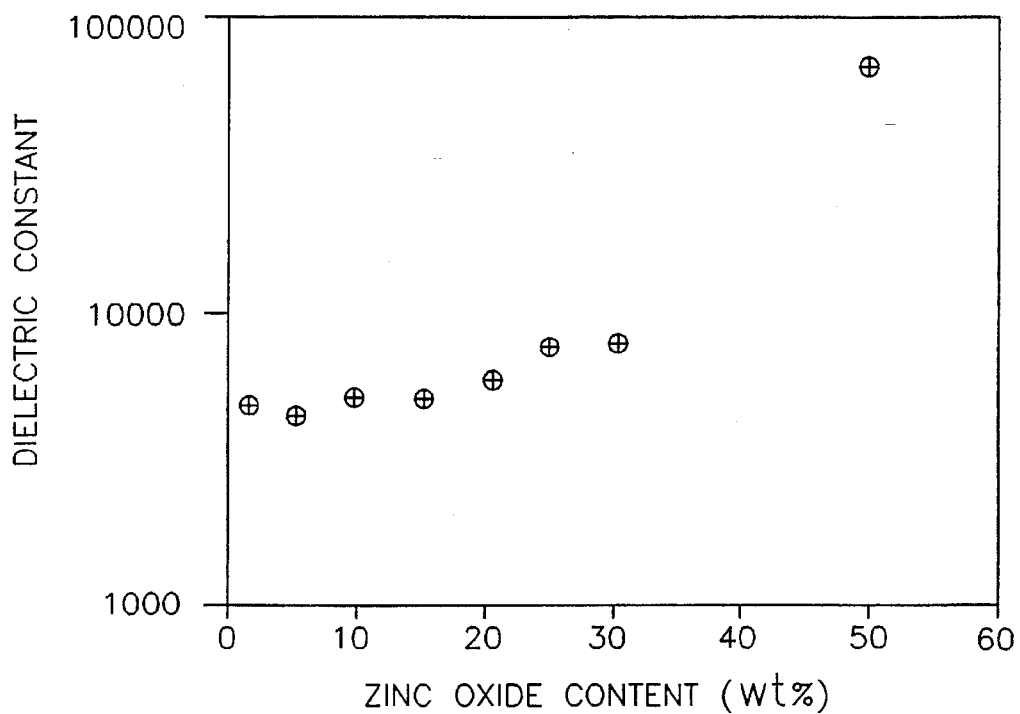
FIG. 1  DIELECTRIC CONSTANT VERSUS ZINC OXIDE CONTENT (WT%) MEASURED AT 1 KHZ.
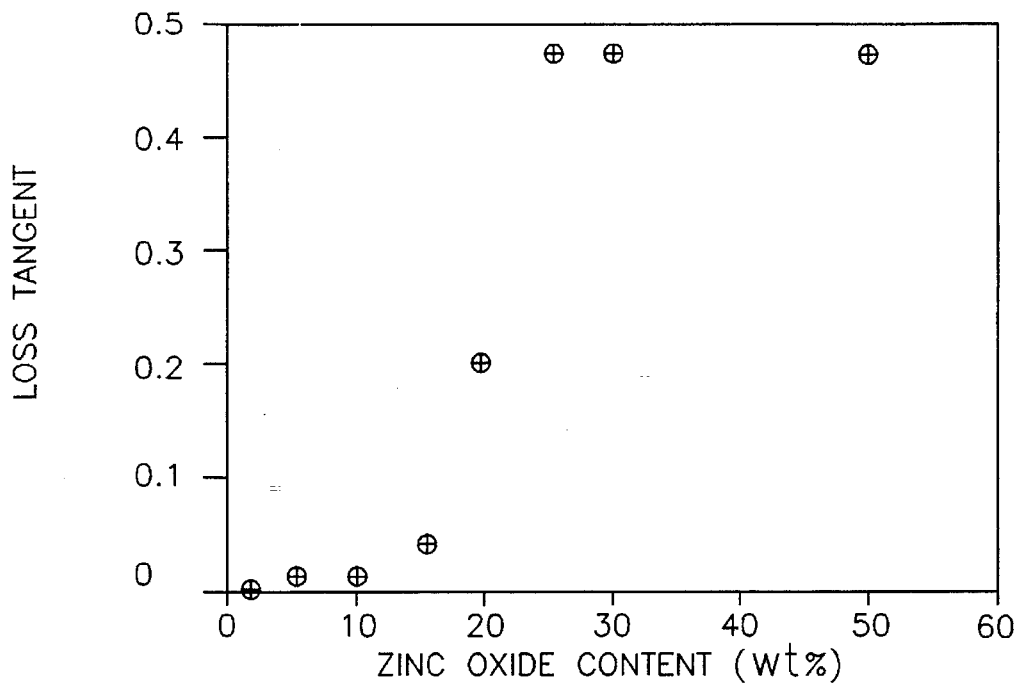
FIG. 2  LOSS TANGENT VERSUS ZINC OXIDE CONTENT (WT%) MEASURED AT 1 KHZ.

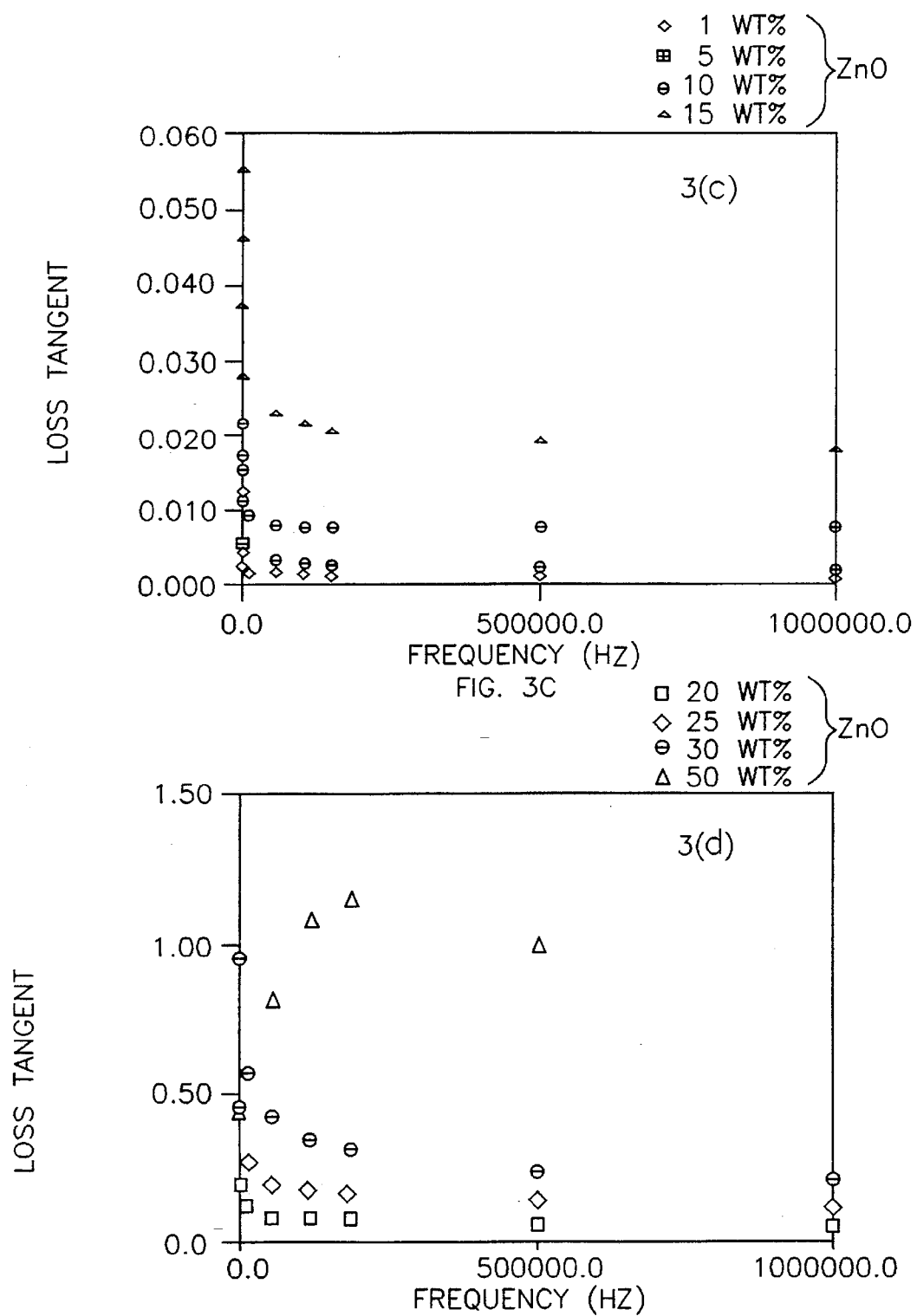
FIG. 3D DIELECTRIC CONSTANT AND LOSS TANGENT VS. FREQUENCY FOR BSTO–ZnO CERAMIC COMPOSITES.

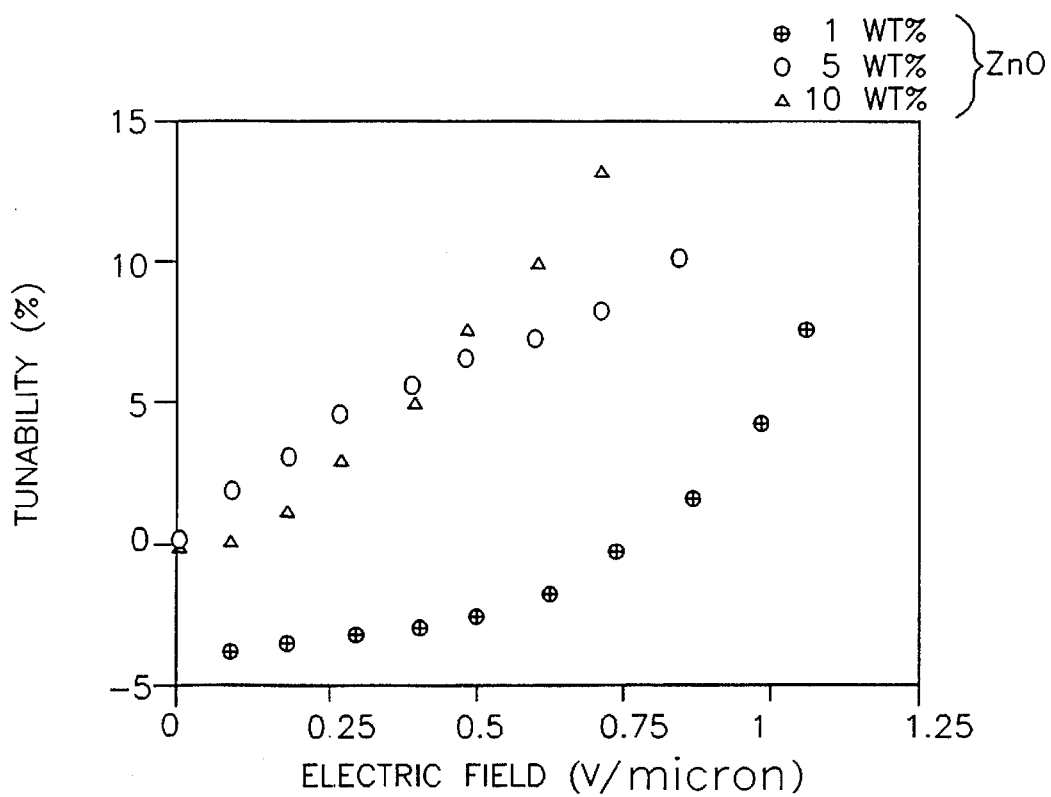
FIG. 4 TUNABILITY (%) VS APPLIED VOLTAGE FOR A BSTO-ZnO (1.5 AND 10 WT%) SPECIMENS.
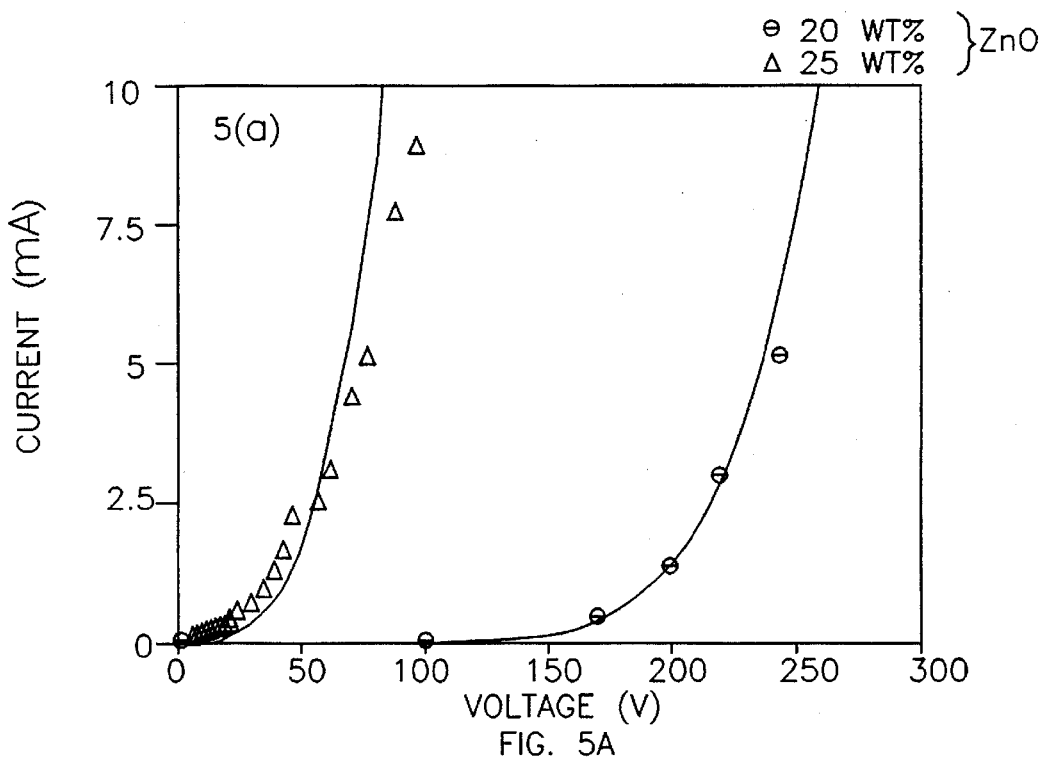
FIG. 5A

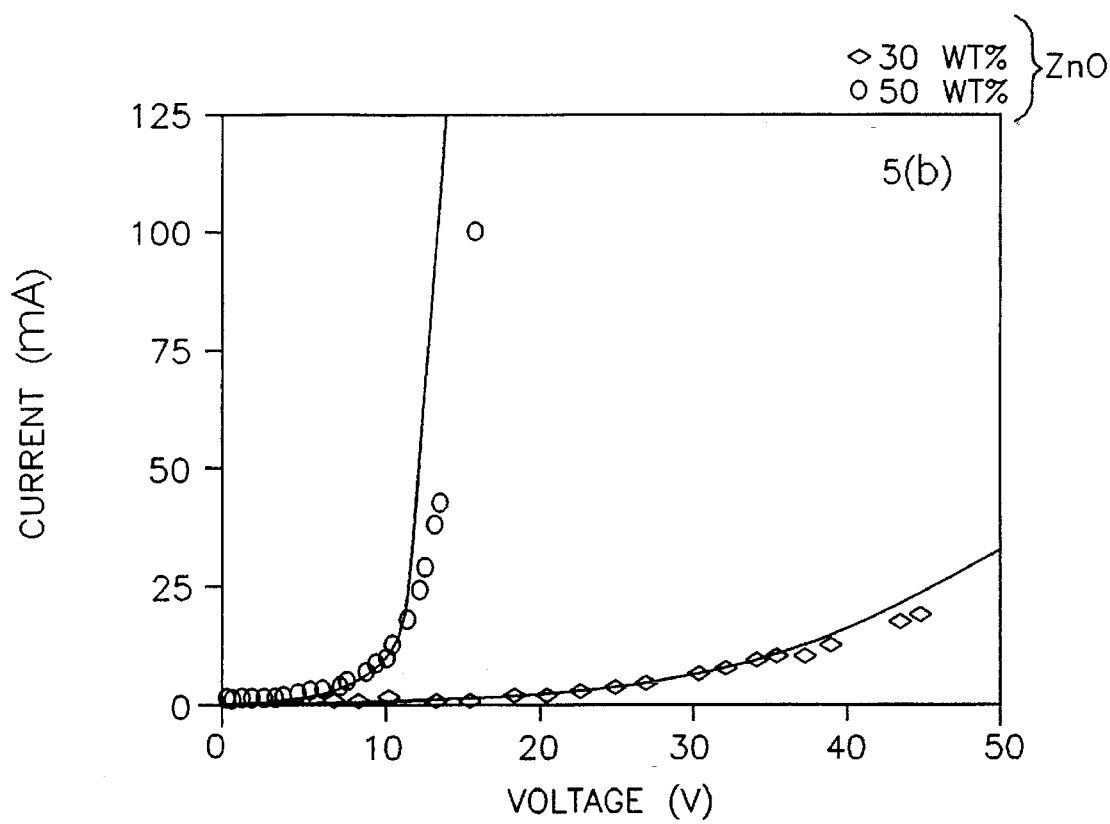
FIG. 5B CURRENT VS VOLTAGE FOR A BSTO-ZnO (20, 25 30 AND 50 WT%) COMPOSITES.
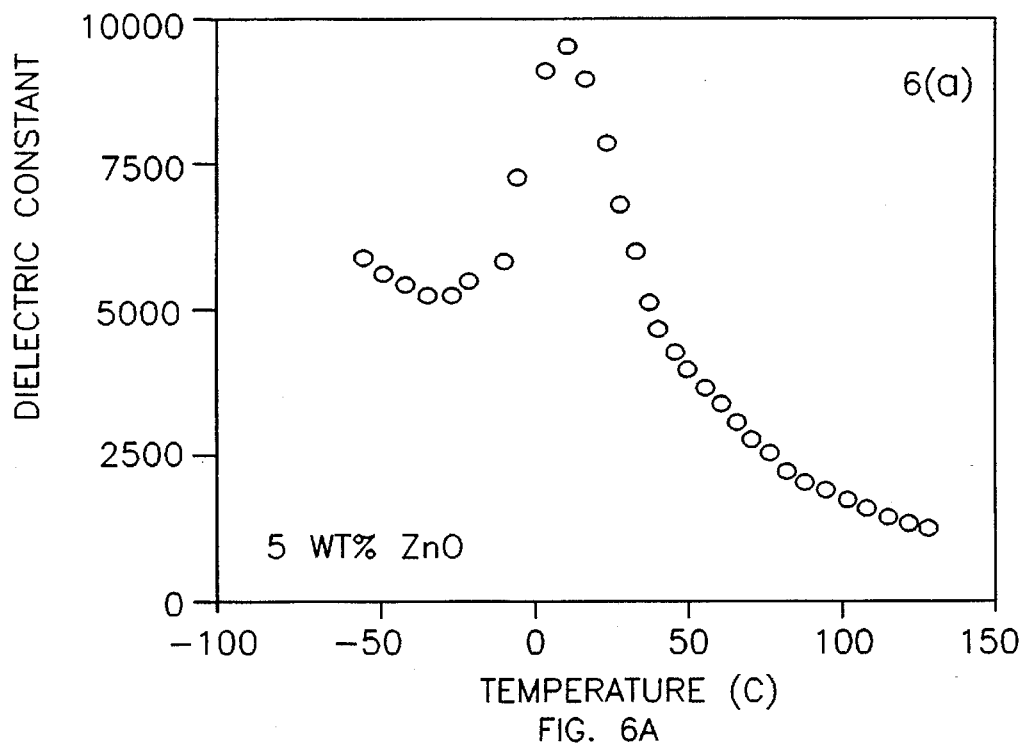
FIG. 6A

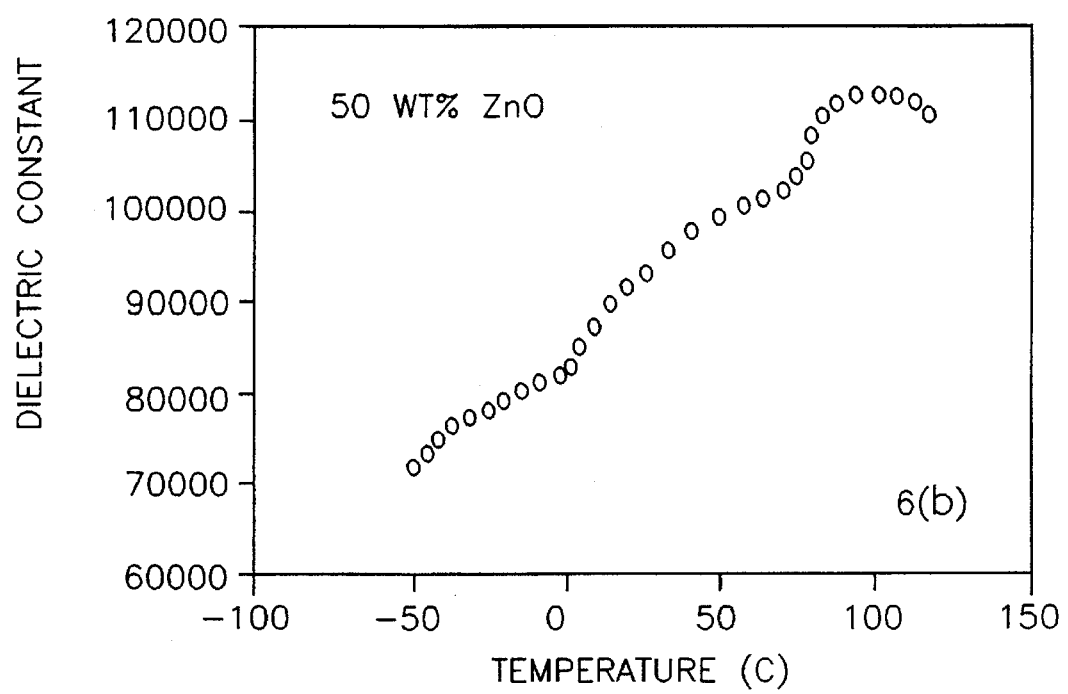
FIG. 6B TEMPERATURE DEPENDENCE OF THE DIELECTRIC CONSTANT FOR A BSTO-ZnO (5 AND 50 WT%) SPECIMENS.

CERAMIC FERROELECTRIC COMPOSITE MATERIAL-BSTO-ZNO

GOVERNMENT INTEREST

The invention described herein may be manufactured, used and licensed by or for the U.S. Government without the payment to us of any royalty thereon.

FIELD OF THE INVENTION

The invention relates generally to a ceramic ferroelectric composite material, and more particularly to a ceramic ferroelectric composite material consisting of a Barium Strontium Titanate and a zinc oxide for improving electronic properties.

BACKGROUND OF THE INVENTION

This patent application is associated with the materials cited in U.S. Pat. No. 5,312,790 granted on May 17, 1994, entitled "Novel Ceramic Ferroelectric Material", U.S. patent Ser. No. 08/207,446 filed Mar. 7, 1994, now U.S. Pat. No. 5,427,988, entitled "Novel Ceramic Ferroelectric Composite Material—BSTO-MgO", U.S. patent Ser. No. 08/207,447 filed Mar. 7, 1994, now U.S. Pat. No. 5,486,491, entitled "Novel Ceramic Ferroelectric Composite Material—BSTO-ZrO$_2$," and U.S. patent Ser. No. 08/215,877 filed Mar. 22, 1994, entitled "Novel Ceramic Ferroelectrics for Phased Array Antennas".

The need exists for the fabrication of ceramic materials having improved electronic properties which may be adjusted for a particular, intended use. The present invention deals with novel ceramic ferroelectric materials having ideal properties for use, for example, in multilayer capacitors, capacitor-varistors, in non-volatile computer memory or for use in phased array antenna systems.

Recently, in the multilayer ceramic capacitor (MLC) market, there is a growing requirement for miniaturization, large capacitance, and low cost. The ferroelectric materials are a replacement for other high dielectric constant materials currently under investigation. These include lead based relaxor materials such as PbMg$_{1/3}$Nb$_{2/3}$O$_3$ etc. The main problem with these materials is the difficulty encountered in the processing procedures. The volatilization of lead and the presence of impurities creates a deleterious pyrochlore phase which drastically lowers the dielectric constants which can be achieved and increases loss tangents in the material. Other Barium Strontium Titanate and Barium Titanate materials which are currently in use do not possess dielectric constants in the same range as those presented in this invention.

Another application for these materials is a combined capacitor-varistor device. In general this would be used as a protective device used in parallel with electronic information processing circuits to protect against spurious voltage surges and voltage transients. The capacitive aspect of the device would guard against low-amplitude and high frequency transients which cause errors in signal processing or in stored signals. The varistor function of the device protects against high-amplitude voltage surges. The device combination is a replacement for a capacitor Zener diode combination which is often bulkier than the circuit it is protecting.

The fabrication of the capacitor-varistor device has been attempted previously by appropriately doping SrTiO$_3$ to form grain boundary phases or layers which exhibit the desirable characteristics. (N. Yamaoka, M. Masuyama and M. Fukui, "SrTiO$_3$-Based Boundary Layers Capacitor Having Varistor Characteristics", Ceramic Bulletin, vol 62, pp. 698–700 (1983).). Also discrete layers of ZnO and Pb(Fe$_{1/2}$Nb$_{1/2}$)O$_3$—Pb(Fe$_{2/3}$W$_{1/3}$)O$_3$ (dielectric constant of 27000 to 32000) have been fabricated (H. C. Ling and M. F. Yan, "A Monolithic Capacitor-Varistor Device—Properties and Microstructure, Ceramic Transactions, vol. 8, pp. 253–260 (1989). (Proceedings of the Symposium on Ceramic Dielectrics held in Indianapolis, Ind., Apr. 23–27, 1989)). The problem with the former scheme has been with the high loss tangents and high threshold voltages derived from the metallic additives and the semiconducting capacitor. The problem associated with the latter scheme, as mentioned previously, is with the processing of the lead based capacitor compounds and the deleterious inter-diffusion of species from the ZnO varistor and lead-based capacitor layers. The materials described within the present invention circumvent some of these problems by combining the device into one composite ceramic material which can be processed as a bulk ceramic or as a thin film (by pulsed laser deposition) or thick film multi-layer (tape-cast) laminate.

At low doping levels of zinc oxide the dielectric constant of BSTO-ZnO is increased without increasing the loss tangent or without producing varistor characteristics. Therefore, these compositions would exhibit high dielectric constants and high tunabilities would be useful in many low to moderate frequency antenna applications.

Barium Strontium Titanate (BaTiO$_3$—SrTiO$_3$), also referred to herein as BSTO, has been known to be used for its high dielectric constant (approximately ranging from 200 to 6,000) in various electronic applications. This component acts as the capacitive part of the device. ZnO is added to BSTO and contributes to the varistor characteristics of the device. Although the employment of BSTO in electronic devices is known, nowhere in the technical arena of ceramic art has there been any suggestion of modifying BSTO, or combining BSTO with additives, in the manner described herein. Moreover, the specific BSTO combinations, which have enhanced electronic properties, are deemed novel.

SUMMARY OF THE INVENTION

The present invention provides a ceramic ferroelectric composite material consisting essentially of Barium Strontium Titanate (BSTO) and zinc oxide (ZnO). The Barium Strontium Titanate is represented as Ba$_{1-x}$Sr$_x$TiO$_3$ in which x is greater than 0.0 but less than or equal to 0.75. The Barium Strontium Titanate and the zinc oxide are present in amounts to provide a composite having a high dielectric constant, a low loss tangent, a low threshold voltage, a high nonlinear voltage exponent and a high tunability. The weight ratios of Barium Strontium Titanate to zinc oxide may range from 99% wt.–50% wt. BSTO to 1% wt.–50% wt. zinc oxide.

The subject matter of the present invention is related to the fabrication of specific ceramic materials which have sought after properties in, for example, capacitor-varistor devices. The sought after properties include (1) a high dielectric constant; (2) a low loss (loss tangent); (3) low threshold voltage; (4) high nonlinear voltage exponent and (5) high tunability. The dielectric constant is related to the energy storage in the material; whereas, the loss tangent is related to the power dissipation in the same material. In general, the dielectric function is a complex quantity with $\epsilon = \epsilon' - i\epsilon''$; and the loss tangent, $\tan \partial = \epsilon''/\epsilon' = 0.001$ or less. At high voltages, the varistor conducts current given by the power-law relation $$I = AV^\alpha$$

where V is the applied voltage, I is the current, A is the proportionality constant and α is the index of nonlinearity.

The threshold voltages range from 5–100 volts and the nonlinearity index ranges from 6–10 volts depending upon the composition of the materials employed. Also the threshold voltage can be determined by the following physical parameters $$V_0 = (3.0 t/G) V_t$$

where t is equal to the thickness, $V_t$ is the tunneling voltage (2 to 3 V required for the electrons to tunnel through the grain boundaries), and G is the average grain size of the ceramic specimen.

Tunability may be defined as ((dielectric constant with no applied voltage)–(dielectric constant with an applied voltage))/(dielectric constant with no applied voltage). For simplicity purposes, tunability can be represented as $$T = \frac{(X - Y)}{X}$$

wherein, X=(dielectric constant with no applied voltage) and

Y=(dielectric constant with an applied voltage).

The tunability of a material under an electric field of less than 1.0 KV/cm can range from 7.5–13.5% depending upon the composition of the materials employed. The compositions which are useful for the antenna application range from 1 to 15% ZnO, after which the specimens begin to conduct current.

The materials herein combine Barium Strontium Titanate ($BaTiO_3$—$SrTiO_3$) with Zinc Oxide (ZnO). These materials, encompassed by the present invention, are superior in that they are homogenous, extremely dense, easily machinable, and possess superior electronic properties at required operating frequencies. Moreover, the materials herein have low water absorptivity. Typically these materials will absorb less than 2% by weight of water therein. Hence, the materials within the scope of the present invention are environmentally stable—for example, they have good moisture and temperature stability.

Replacing the currently employed materials with the novel ferroelectric composite described in the present invention will improve the overall performance of the protection device as well as reduce the cost, and size of the capacitor-varistor combination to be proportional to the electronic circuit it is protecting. Also the size of the antenna part would be reduced especially at low frequencies (0.6 to 10 GHz).

Accordingly, it is an object of the present invention to provide a ferroelectric material suitable for, but not limited to, use in capacitor-varistor devices.

It is a further object of the present invention to fabricate a material exhibiting enhanced electronic properties.

It is still a further object of the present invention to provide a ferroelectric material having a high dielectric constant, a low loss, low threshold voltage, a high degree of nonlinearity and high tunability.

It is a further object of the present invention to provide materials having electronic properties, wherein said electronic properties can be adjusted through compositional means in such a manner that they can be employed for protection of any electronic circuit.

It is a further object of the present invention to provide a ferroelectric material which is easily machinable.

Still, it is a further object herein to provide a ferroelectric material which possesses these properties at the required frequencies for the intended application.

The means to achieve these and other objectives of the present invention will be apparent from the following detailed description of the invention and claims.

BRIEF DESCRIPTION OF THE DRAWINGS

FIG. 1 is a graph showing the relationship between dielectric constant and zinc oxide content measured at 1 KHz.

FIG. 2 is a graph showing the relationship between loss tangent and zinc oxide content (wt %).

FIG. 4 is a graph showing the relationship between tunability and applied voltage for a BSTO-ZnO (1,5 and 10 wt %) specimens.

FIGS. 5 (a) and (b) are graphs showing the relationship between current and voltage for a BSTO-ZnO (20,25,30 and 50 wt %) composites.

FIGS. 6 (a) and (b) are graphs showing the temperature dependence of the dielectric constant for a BSTO-ZnO (5 and 50 wt %) specimens.

DETAILED DESCRIPTION OF THE INVENTION

Figure 3A:
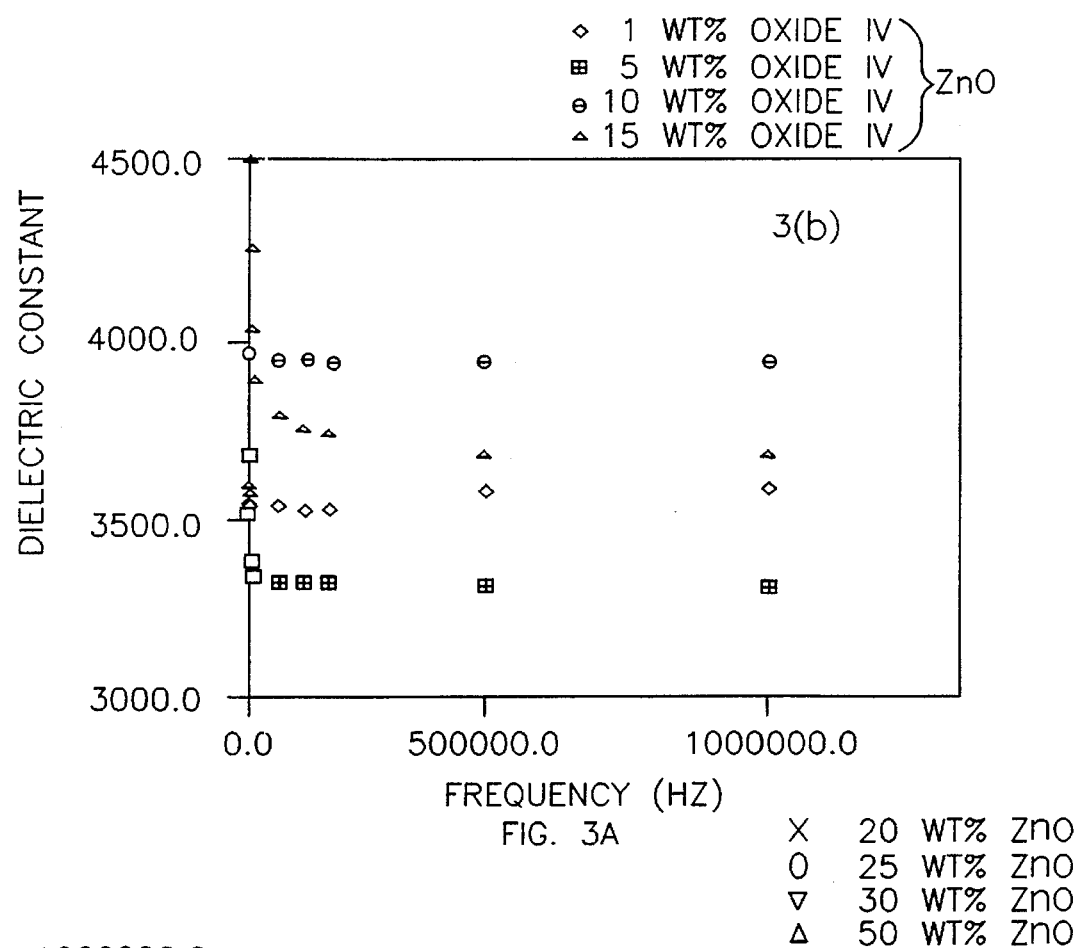
FIGS. 3 (a)–(d) are graphs showing the relationship between dielectric constant and loss tangent and frequency for BSTO-ZnO ceramic composites.

The present invention encompasses the fabrication of novel ceramic materials having enhanced electronic properties. These materials are superior to other currently employed ferroelectric materials.

When one considers the optimization in the electronic properties of ceramic materials, the following parameters must be taken into consideration:

(1) Dielectric Constant: Ideally the dielectric constant, ranging from approximately 3500 to 110,000, should be as high as possible to produce the maximum capacitance. The dielectric constant should be as high as possible without increasing the loss tangent. For other various applications high dielectric constant, low loss materials, are preferable. For example in lower frequency (5 to 10 GHz) antenna systems these properties are required.

(2) Low Loss: The loss tangent (intrinsic to the material) serves to dissipate or absorb the incident energy and therefore is most effective in any of the proposed devices when the loss tangent is in the range of 0.02 or less for antenna applications and 0.5 or less for capacitor-varistor applications. For phased array applications, the low loss tangent serves to decrease the insertion loss and hence increase the phase shifter per decibel of loss. The operating frequency is controlled by the loss tangent.

(3) Low Threshold Voltage ($V_0$): For applications in microelectronic circuits the threshold voltage must be between 5–10 volts. The low threshold voltage allows a current to flow at a particular value which is related to grain size (G), electron tunneling voltage which is 2 to 3 V, and the thickness (see equation (2)). In the present case the controlling factor for the bulk ceramics appears to be the grain size and the segregation layers (layers surrounding the zinc oxide grains). Trapping in the segregation layers is thought to be responsible for the nonlinear (nonohmic) properties of zinc oxide ceramics (M. Matsuoka, "Nonohmic Properties of Zinc Oxide Ceramics", Japanese Journal of Applied Physics, vol. 10, p. 736 (1970)). The threshold voltage applies only to the capacitor-varistor device application.

(4) High Non-linear Voltage Exponent (α: The magnitude of the non-linear voltage exponent is related to the speed at which the device can begin to draw a current above the required threshold voltage. Therefore, the larger non-linear exponents are preferred (varistor, with no capacitive component, compositions have α=50, M. Matsuoka). Again, this is related to the capacitor-varistor application.

(5) High Tunability: The tunability of a particular material effects the material's electronic properties by how much the dielectric constant changes with applied voltage. The amount of phase shifting ability is directly related to the tunability; therefore, higher tunabilities are desired. The tunability can be increased to some extent by decreasing the sample thickness. The insertion loss is inversely related to the tunability so that the larger the tunability, the smaller the insertion loss. Optimum electronic properties would have tunabilities ranging from 4 to 50% (depending upon other factors such as the dielectric constant and loss tangent). The tunability is primarily important for use in phased arrays antenna systems.

The materials within the scope of the present invention fall within the optimum characteristics outlined above. These materials are $Ba_{1-x}Sr_xTiO_3$—ZnO, wherein x is greater than 0.0 but less than or equal to 0.75. This formulation may be referred to as Barium Strontium Titanate and zinc oxide. The weight ratios of Barium Strontium Titanate (BSTO) to zinc oxide may range from 99% wt.–50% wt. BSTO to 1% wt.–50% wt. zinc oxide. A typical composition within the present invention may comprise 70% by weight BSTO (wherein x=0.40) and 30% by weight zinc oxide (ZnO). This composition has a dielectric constant of 7859, a loss tangent of 0.46, a threshold voltage of 20 volts, and a nonlinearity exponent of 10.39.

Zinc oxide is used herein to adjust the electronic properties of BSTO. Zinc oxide at low doping levels (1–15% wt.) increases the dielectric constant and has low loss tangents and high tunabilities which meet the requirements for various applications—for example, in the antenna arts. At higher levels, it continues to increase the dielectric constant drastically especially at low frequencies, and the composites begin to conduct current in and exhibit non-ohmic behavior. The electronic properties of the formulation herein can be adjusted for use in (at low doping levels of up to 10–15 wt % ZnO) any discrete element phase shifter design, such as planar microstrip, wave guide geometries or for use in a parallel plate structure and at high doping levels for use in capacitor-varistor applications.

It has been found that the electronic properties of BSTO zinc oxide are reproducible to within 2%. Hence, once a specific formulation of BSTO zinc oxide is determined to be suitable for a specific purpose, the material can be accurately reproduced.

The preparation of BSTO zinc oxide may be accomplished by obtaining powders of Barium Titanate and Strontium Titanate. These powders are ball milled in a conventional manner in an organic solvent. This particular mixture is then air-dried and calcined at approximately 200 degrees centigrade below the sintering temperature for several hours. The resultant BSTO is then mixed with zinc oxide in the desired weight percentage and re-ball milled in an organic solvent with a binder. The final mixture is then air-dried, once again, and dry-pressed at approximately 7,000 p.s.i. The final samples are sintered in air. Proper electroding of the composite ceramics must be done. The samples were screen printed with a FERRO #3309 Ag (Electronic Materials Division, Santa Barbara, Calif.) silver conductive ink. They were subsequently fired at 850° C. for ten (10) minutes. The samples were then dipped in a bath of 2% silver (Ag), 62% tin (Sn) and 36% lead (Pb) solder with lead clips attached.

Table 1 sets forth the various measured properties of BSTO zinc oxide, wherein the formulation is represented by $Ba_{0.60}Sr_{0.40}TiO_3$ - zinc oxide. These values were obtained by measuring the immersion densities of the specimens (immersed in ethanol) using a modified ASTM standard D-116-65 and documented in (J. T. Jones and M. F. Bernard, "Ceramics: Industrial Processing and Testing", Chp. 7, pp. 97–113.).

TABLE I

| Zinc Oxide Content (wt. %) | Density (g/cc) | % Porosity | % Absorption |
|---|---|---|---|
| 1.0 | 5.269 | 0.94 | 0.14 |
| 5.0 | 5.460 | 0.35 | 0.06 |
| 10.0 | 5.443 | 0.56 | 0.08 |
| 15.0 | 5.378 | 0.30 | 0.05 |
| 20.0 | 5.359 | 0.78 | 0.11 |
| 25.0 | 5.394 | 1.03 | 0.15 |
| 30.0 | 5.405 | 0.39 | 0.06 |
| 50.0 | 5.313 | 2.01 | 0.29 |

Figure 3B:
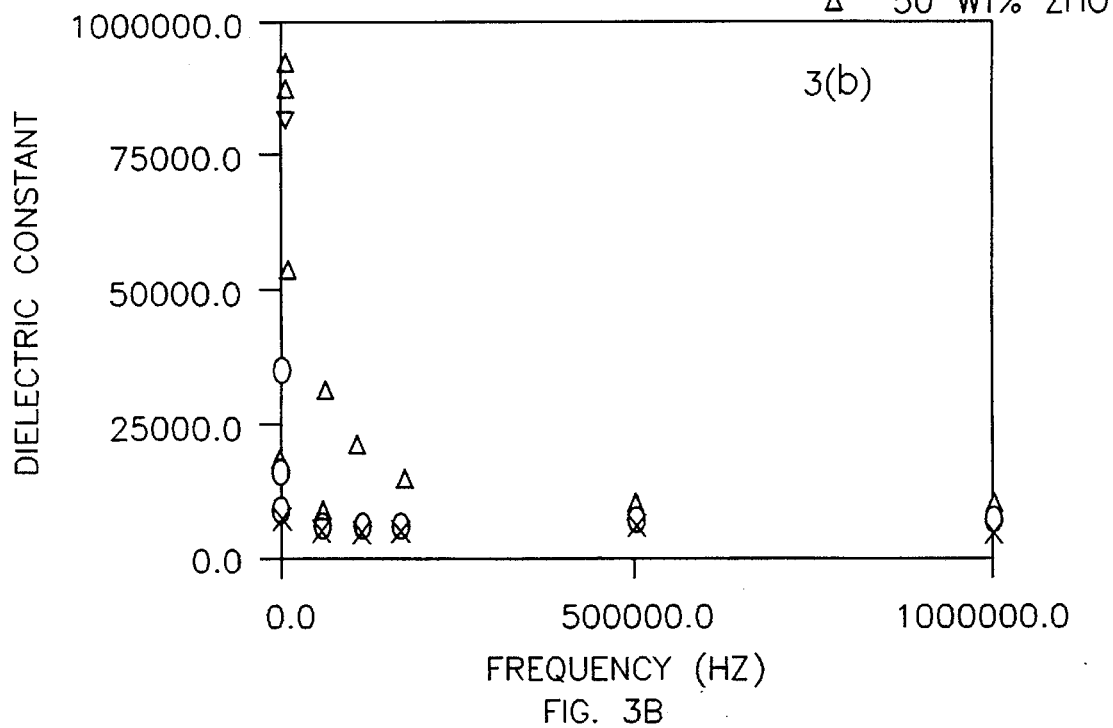

The electronic properties of some of the formulations within the present invention are set forth in Tables 2 and 3. The representative formulations for which electronic properties are tabulated are for Ba=0.60 with varying zinc oxide content. Frequency used was 1 kHz and dielectric constants have been corrected for edge (fringe) capacitance. The dielectric constant versus zinc oxide content is shown in FIG. 1 and the loss tangent versus zinc oxide content is shown in FIG. 2. Table 2 presents the electronic properties associated with the lower doping levels of zinc oxide and the properties (dielectric constant, loss tangent and % tunability) correlated to the phased array antenna application. Table 3 contains the electronic properties associated with the capacitor-varistor device, which include the dielectric constant, loss tangent, threshold voltage and non-linearity exponent. The grain size has also been included in this table (except for 1.0 wt % ZnO, because the poor sample condition after etching). The dielectric constant and loss tangent vs frequency is shown in FIGS. 3 (a)–(d). The % tunability is shown in FIG. 4 for a BSTO-ZnO (1, 5 and 10 wt %) specimens. As noted previously, both the dielectric constant decreases and the loss tangent decrease with frequency.

TABLE 2

| | BSTO (Ba = 0.60) and Zinc oxide | | | |
|---|---|---|---|---|
| Zinc oxide Content wt. % | Dielectric Constant | Loss Tangent | Tunability (Percent) | Electric Field (V/um) |
|---|---|---|---|---|
| 1.0 | 3756 | 0.00236 | 7.334 | 1.0 |
| 5.0 | 3416 | 0.01276 | 8.957 | 0.8 |
| 10.0 | 3908 | 0.01320 | 13.11 | 0.7 |
| 15.0 | 3942 | 0.03708 | | |
| 20.0 | 4685 | 0.19113 | — | — |
| 25.0 | 7520 | 0.46976 | — | — |
| 30.0 | 7859 | 0.46927 | — | — |
| 50.0 | 71922 | 0.46891 | — | — |

TABLE 3

| BSTO (Ba = 0.60) and Zinc oxide | | | | | |
| --- | --- | --- | --- | --- | --- |
| Zinc oxide Content wt. % | Dielectric Constant | Loss Tangent | Threshold Voltage | Non-linearity Exponent | Grain Size (um) |
| 1.0 | 3756 | 0.00236 | — | — | — |
| 5.0 | 3416 | 0.01276 | — | — | 10.24 |
| 10.0 | 3908 | 0.01320 | — | — | 9.774 |
| 15.0 | 3942 | 0.03708 | — | — | 8.610 |
| 20.0 | 4685 | 0.19113 | 100 | 6.510 | 8.387 |
| 25.0 | 7520 | 0.46976 | 25 | 5.390 | 7.514 |
| 30.0 | 7859 | 0.46927 | 20 | 10.290 | 6.806 |
| 50.0 | 71922 | 0.46891 | 5 | 8.349 | 5.909 |

FIGS. 5 (a–b) shows the current vs voltage for several BSTO-ZnO (20, 25, 30 and 50 wt % ZnO) composites. As indicated in Table 3, it should be noted that as the zinc oxide content is increased, the dielectric constant and the non-linearity exponent increases. This increase in the non-linearity is also roughly related to the decrease in the grain size, although much scatter in the data is noted. However, the threshold voltage clearly decreases with decrease in grain size. Finally, the temperature dependence of the dielectric constant for a BSTO-ZnO (5 and 50 wt %) specimens are shown in FIGS. 6(a) and 6(b). As shown in FIG. 6(b), the sharpness of the peak of the Curie temperature is diminished with large additions of zinc oxide. This is an important operating parameter for microelectronic circuits.

The BSTO-Zinc Oxide materials exhibit behavior which renders them suitable for use both (at low zinc oxide content <15 wt %) in phased array antenna systems and (at high zinc oxide content >15 wt %) as a capacitor-varistor protection device for microelectronic circuits. The improved properties of these composites includes very low threshold voltages (@5 V), reasonable nonlinear coefficients, moderate to low loss tangents, tunable and extremely high dielectric constants, and temperature stability. The threshold voltage for the BSTO-Zinc Oxide (50 wt %) specimen is lower than reported for any bulk capacitor-varistor device (which has been reported to be around 100 V (N. Yamaoka, M. Masuyama and M. Fukui, "SrTiO$_3$-Based Boundary Layers Capacitor Having Varistor Characteristics", Ceramic Bulletin, vol 62, pp. 698–700 (1983)) and the capacitance is as high as that obtained for multilayered structures (nearly twice than that reported) (H. C. Ling and M. F. Yan, "A Monolithic Capacitor-Varistor Device—Properties and Microstructure, Ceramic Transactions, vol. 8, pp. 253–260 (1989). (Proceedings of the Symposium on Ceramic Dielectrics held in Indianapolis, Ind., Apr. 23–27, 1989)).

EXAMPLE 1

Powder forms of Barium Titanate and Strontium Titanate were obtained from Ferro Corp., Transelco Division, Pen Yan, N.Y. (product nos. 219-6 and 218, respectively). The powders were stoichiometrically mixed in a slurry of ethanol and ball-milled using alumina 3/16" diameter grinding media. This was performed for 24 hours. The mixture was subsequently air dried and calcined for 5 hours at approximately 1100° C. The resulting BSTO was mixed with powder Zinc oxide (Johnson Matthey Electronics, Ward Hill, Mass., product number 87812) in the proper weight percent. This mixture was then re-ball milled in a slurry of ethanol using a 3/16" diameter alumina grinding media for an additional 24 hours.

To the resulting BSTO/Zinc oxide mixture, Rhoplex B-60A (Rohm and Haas Co., Philadelphia, Pa.), which is a 3% wt. organic binder consisting of an aqueous emulsion of acrylic polymer, was added to improve green body strength and to permit sample fabrication in greater dimensions. (Green body strength refers to the ability of unfired material to remain intact and to withstand handling; it also implies better densities in the fired pieces.) Other binders and plasticizers may be added at this point to allow extrusion molding or for fabrication of tape-cast sheets of material.

The material is then air-dried and dry-pressed at a pressure of approximately 7,000 p.s.i. Sintering schedules are ascertained by employing a deflectometer such as a Mitutoyo digimatic indicator and miniprocessor (Mitutoyo Corp., Paramus, N.J.). The final samples were fired in various furnaces and the densities (immersion density) of the samples were found to be reproducible to within 1 to 2%.

The properties of the resulting BSTO-Zinc oxide samples are set forth in Table 1, above.

While particular embodiments of the present invention have been shown and described, it will be obvious to those skilled in the art that changes and modifications may be made without departing from this invention. For example, the invention may be modified to include ceramic-ceramic composites of BSTO and other zinc oxide based compounds depending upon the particular requirements of the intended application. Also the composites can easily be made into thick films by tape-casting or screen printing. Thereby the thickness of the layers can be adjusted adding another controlling parameter (see equation 2) for the threshold voltage. Thin films can be fabricated using laser ablation or other thin film deposition techniques such as CVD, sol-gel, etc., and can therefore the composites can be easily integrated as protection devices into microelectronic circuits and can be used in various phased array antenna applications where thin film technology is required.

It is, therefore, intended that the claims herein are to include all such obvious changes and modifications as fall within the true spirit and scope of this invention.

I claim:

1. A ceramic Ferroelectric composite material BSTO-ZnO material consisting of;

Barium Strontium Titanate, said barium Strontium Titanate represented as $Ba_{1-x}Sr_xTiO_3$, wherein said x is greater than 0.0 but less than or equal to 0.75;

and zinc oxide represented as ZnO;

wherein the weight ratio of said Barium Strontium Titanate to zinc oxide ranges from approximately 99–50% wt. said Barium Strontium Titanate to approximmately 1%–50% wt. said zinc oxide.

2. The ceramic ferroelectric composite material-BSTO-ZnO according to claim 1, wherein said Barium Strontium Titanate is $Ba_{1-x}Sr_xTiO_3$, wherein x=0.40.

3. The ceramic ferroelectric composite material-BSTO-ZnO according to claim 1, wherein the ratio of said Barium Strontium Titanate to said zinc oxide is approximately 70% wt. said Barium Strontium Titanate to approximately 30% wt. said zinc oxide.

4. The ceramic ferroelectric composite material-BSTO-ZnO according to claim 1, wherein the weight ratio of said Barium Strontium Titanate to said zinc oxide ranges from approximately 99%–85% wt. said Barium Strontium Titanate to approximately 1%–15% wt. said zinc oxide for use in phased array antenna systems.

5. The ceramic ferroelectric composite material BSTO-ZnO according to claim 1, wherein the weight ratio of said Barium Strontium Titanate to said zinc oxide ranges from approximately 85%–50% wt. said Barium Strontium Titanate to approximately 15%–50% Wt. said zinc oxide for use in a capacitor-varistor protection device for microelectric circuits;

wherein said Barium Strontium Titanate and said zinc oxide are present in an amount to provide a composite having a a high dielectric constant of from approximately 3500 to 110,000; and a low loss tangent of 0.5 or less;

a low threshold voltage of between 5–100 volts;

a high nonlinear voltage exponent, and and high tunability ranging from 4 to 50%.

* * * * *